United States Patent [19]

Ohtake

[11] Patent Number: 5,666,576
[45] Date of Patent: Sep. 9, 1997

[54] BRIGHT FRAME VIEW-FINDER OF NATURAL LIGHTING TYPE ADDITIONALLY PROVIDED WITH LIGHT SOURCE FOR SECONDARY DIFFUSING SURFACES

[75] Inventor: Katsuhiro Ohtake, Ohmiya, Japan

[73] Assignee: Fuji Photo Optical Co., Ltd., Saitama-ken, Japan

[21] Appl. No.: 295,262

[22] Filed: Aug. 24, 1994

[30]  Foreign Application Priority Data

Aug. 26, 1993 [JP] Japan ................................ 5-234179

[51] Int. Cl.$^6$ .................................................. G03B 13/02
[52] U.S. Cl. .......................................... 396/288; 396/296
[58] Field of Search ................................. 354/219, 224, 354/225; 396/373, 382, 385, 386, 288

[56]  References Cited

U.S. PATENT DOCUMENTS

| | | |
|---|---|---|
| 3,903,530 | 9/1975 | Taguchi et al. . |
| 4,165,930 | 8/1979 | Matsumoto et al. ............ 396/288 |
| 4,200,380 | 4/1980 | Sato et al. . |
| 4,527,875 | 7/1985 | Shibata . |
| 4,560,264 | 12/1985 | Kitazawa et al. . |

Primary Examiner—David M. Gray
Attorney, Agent, or Firm—Price, Heneveld, Cooper, DeWitt & Litton

[57]  ABSTRACT

Here is disclosed a bright frame view-finder of natural lighting type additionally provided with a light source for secondary diffusing surfaces comprising a secondary light generator plate and an additional lighting means so that the secondary light generator plate may be lighted by the additional lighting means and light images of a field frame and the like may be introduced into a view-finder optical system when the outdoor daylight or ambient light of sufficient intensity is unavailable for photographing. Specifically, the secondary light generator plate is formed with hologram of reflection or transmission type, or the secondary light generator plate comprises a transparent acryl plate having diffusing surfaces and the lighting means comprising a light emitting diode or the like is turned on when the outdoor daylight or ambient light of sufficient intensity is unavailable for intended photographing so that the field frame or the like on the field frame plate may be lighted by diffused light emitted from the secondary light generator plate and appear in the view-finder. When the outdoor daylight or ambient light of sufficient intensity is available for the intended photographing, the outdoor daylight or ambient light passing through the secondary light generator plate lights the field frame or the like and causes the latter to appear in the view-finder.

8 Claims, 3 Drawing Sheets

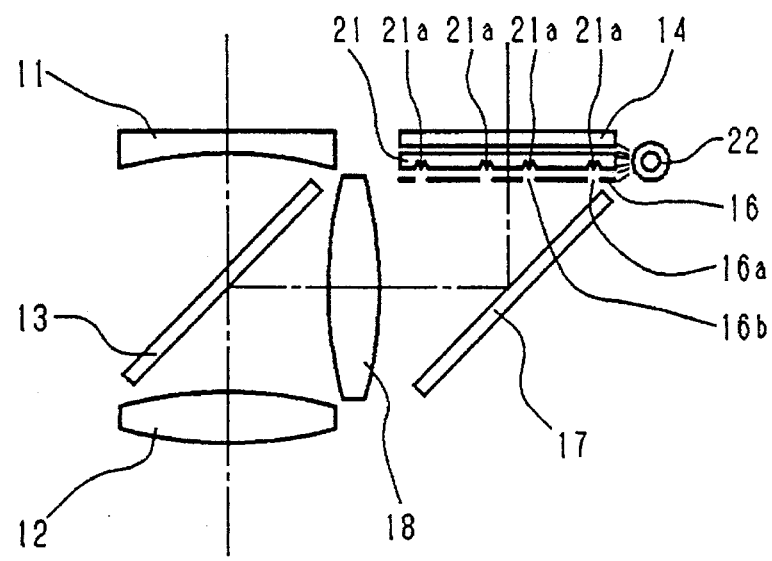
F I G. 3
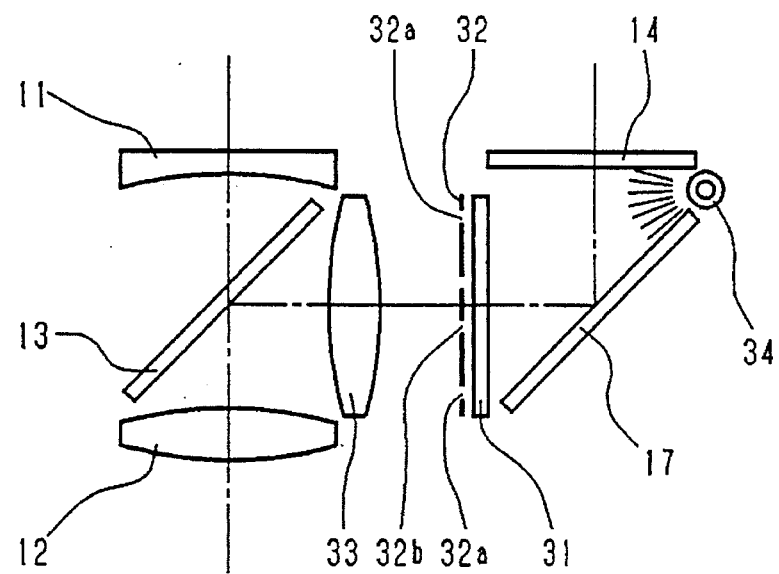
F I G. 4

BRIGHT FRAME VIEW-FINDER OF NATURAL LIGHTING TYPE ADDITIONALLY PROVIDED WITH LIGHT SOURCE FOR SECONDARY DIFFUSING SURFACES

BACKGROUND OF THE INVENTION

1. Technical Field

The present invention generally relates to a view-finder for photographic camera and more particularly to a bright frame view-finder of natural lighting type therefor.

2. Prior Art

With the conventional bright frame view-finder of natural lighting type, a light image of a field frame illuminated by outdoor daylight or ambient light is introduced into a view-finder optical system at an appropriate point along the optical axis of the view-finder optical system so that the field frame may be superimposed upon an object image to be photographed such that a desired composition of the object image may be determined. FIG. 5 of the attached drawing schematically illustrates an example of such well known bright frame view-finder of natural lighting type. As illustrated, a view-finder optical system comprises an objective 1, an eyepiece 2 and a half-mirror 3 or a half-prism (not shown) interposed between these lenses 1 and 2. There is provided separately of such view-finder optical system an optical system causing the light image of the field frame to appear in the view-finder. Specifically, this light image optical system comprises a light shaft window 4 in the form of a diffusing plate provided on the front surface of camera a and a field frame plate 5 adapted to be illuminated by the outdoor daylight or ambient light passing through said light shaft window 4. Thus, the light images of the field display components such as a field frame 5a and a target mark 5b, which serve for autofocus-ranging and are both defined by transparent portions of the field frame 5 illuminated by the diffused light coming from said light shaft window 4, are reflected substantially at a right angle and then inverted by an intermediate lens 7 to provide the virtual images destined to be superimposed upon an object image to be photographed within the view-finder optical system.

In actual operation of photographing, the field frame plate 5 is illuminated by the outdoor daylight or ambient light passing through the light shaft window 4 in the form of diffusing plate and the images of said field frame 5a and target mark 5b appear in the field of the view-finder optical system while the object to be photographed is observed through the view-finder and the image thereof is caught by the view-finder optical system. With the object caught within the target mark 5b and the desired composition determined by the field frame 5a, a well-focussed picture is obtained.

However, such conventional bright frame view-finder of natural lighting type exclusively relies upon the outdoor daylight or ambient light being incident on the light shaft window 4 in the form of diffusing plate to form the light images of the field display components such as the field frame 5a and the target mark 5b, so it is impossible to cause acceptably clear light images of these field frame 5a and the target mark 5b to appear within the view-finder when the outdoor daylight or ambient light is not sufficiently intense. Consequently, both the determination of desired composition and the ranging by means of autofocussing function could not be achieved in night or indoor photographing.

SUMMARY OF THE INVENTION

It is, accordingly, a principal object of the invention to provide a bright frame view-finder of natural lighting type additionally provided with a light source for illuminating secondary diffusing surfaces so improved that, even in the nighttime or in the dark, the field display components such as field frame and target mark reliably appear within the field of the view-finder optical system, allowing not only the object to be reliably ranged but also a desired picture composition to be reliably determined.

The object set forth above is achieved, according to the invention, by a bright frame view-finder of natural lighting type additionally provided with a light source for illuminating secondary diffusing surfaces, said bright frame view-finder comprising: a view-finder optical system, a field frame plate formed with a field frame and the like, said field frame plate being lighted by the outdoor daylight or ambient light so that light images of said field frame and the like may be introduced into the view-finder optical system so as to be superimposed upon an object image to be photographed, a secondary light generator plate provided adjacent said field frame plate on its incident side, said secondary light generator plate being transmissive, and lighting means provided so as to emit lighting rays onto said secondary light generator plate, wherein said secondary light generator plate is lighted by said lighting means so as to introduce the light images of the field frame and the like into said view-finder optical system when the outdoor daylight or ambient light of sufficiently high intensity is unavailable for photographing.

Preferably, said secondary light generator plate is formed with a reflection-type hologram and said lighting means is provided adjacent said field frame plate on its exit side, or said secondary light generator plate is formed with a transmission-type hologram and said lighting means is provided adjacent said field frame plate on its incident side, or said secondary light generator plate comprises a transparent acryl plate having diffusing surfaces and said lighting means is provided laterally of said secondary light generator plate.

Preferably, said lighting means comprises a light emitting diode or a tungsten lamp.

For example, in the case that the secondary light generator plate is formed with a reflection-type hologram, said secondary light generator plate is provided between the light shaft window in the form of diffusing plate and the field frame plate so that the field frame plate is illuminated by said lighting means provided adjacent said field frame plate on its exit side and diffused light is regenerated by the light transmitted through said field frame plate. More specifically, the light emitted from said lighting means and transmitted through the field display components such as the field frame and the target mark illuminates said secondary light generator plate so that the diffused light may be regenerated on the illuminated portions of this secondary light generator plate. Accordingly, the hologram may be formed on said secondary light generator plate over its portion corresponding to the whole area of the field frame plate or at least over its portions slightly larger than the field frame and the target mark, respectively.

In the case that the secondary light generator plate is formed with a transmission-type hologram, the field frame plate is provided between the light shaft window in the form of diffusing plate and the reflector both included in the light image optical system, on one hand, and the intermediate lens, on the other hand, so that said lighting means illuminates said secondary light generator plate and the light transmitted through said secondary light generator illuminates the field frame plate. Thus the light images of the field display components such as the field frame and the target mark are formed within said view-finder optical system under the effect of the diffused light regenerated by said secondary light generator plate as the latter is illuminated by said lighting means.

In the case that the secondary light generator plate comprising the transparent acryl plate having the diffusing surfaces, said secondary light generator plate is provided between the light shaft window in the form of diffusing plate and the field frame plate so that said lighting means provided laterally of said secondary light generator plate illuminates the field frame plate and the light emitted from said lighting means and transmitted through said field frame plate is diffused from said diffusing surfaces. The light images of the field display components such as the field frame and the target mark are formed within said view-finder optical system under the effect of such diffused light.

In this manner, photographing in the dark can be reliably achieved by energizing said lighting means to cause the field display components such as the field frame and the target mark to appear within the field of the view-finder optical system.

It will be obviously appreciated that the outdoor daylight or ambient light incident on the diffusing plate serving as light shaft window is transmitted through the secondary light generator plate and effectively illuminates the field display components such as the field frame and the target mark so far as the outdoor daylight or ambient light of sufficient intensity is available.

BRIEF DESCRIPTION OF THE DRAWING

The invention will be described by way of example in reference with the accompanying drawing, in which:

FIG. 3 is an optical axis diagram similar to FIG. 2, illustrating a second embodiment of the bright frame view-finder of natural lighting type constructed according to the invention;

FIG. 4 is an optical axis diagram similar to FIG. 2, illustrating a third embodiment of the bright frame view-finder of natural lighting type constructed according to the invention.

DETAILED DESCRIPTION OF THE EMBODIMENTS

Now the bright frame view-finder of natural lighting type according to the invention will be described more in details with reference to specific embodiments illustrated in the accompanying drawing. In which FIGS. 1 and 2 illustrate the first embodiment, FIG. 3 illustrates the second embodiment and FIG. 4 illustrates the third embodiment.

Figure 1:
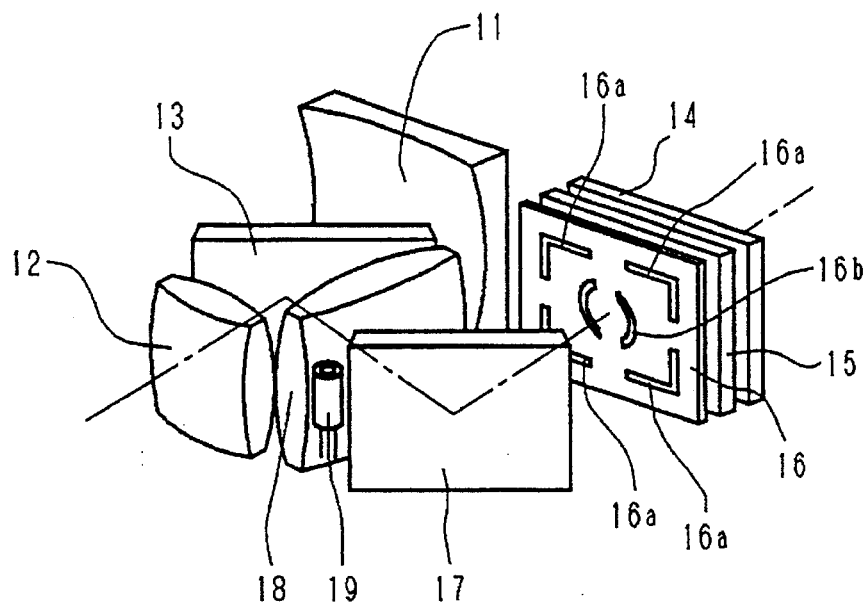
FIG. 1 is a schematic perspective view exemplarily illustrating a bright frame view-finder of natural lighting type constructed according to the invention.
Figure 2:
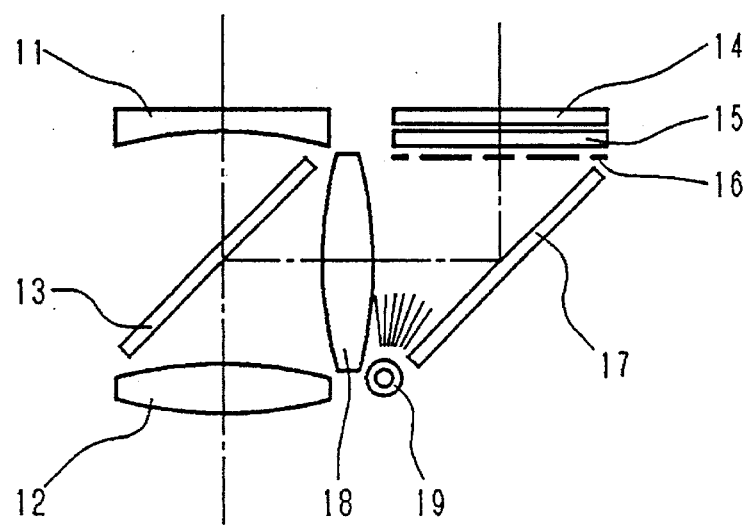
FIG. 2 is a plan view corresponding to FIG. 1, showing optical axes of a view-finder optical system and a light image optical system constituting together the bright frame view-finder of natural lighting type illustrated by FIG. 1.
Figure 5:
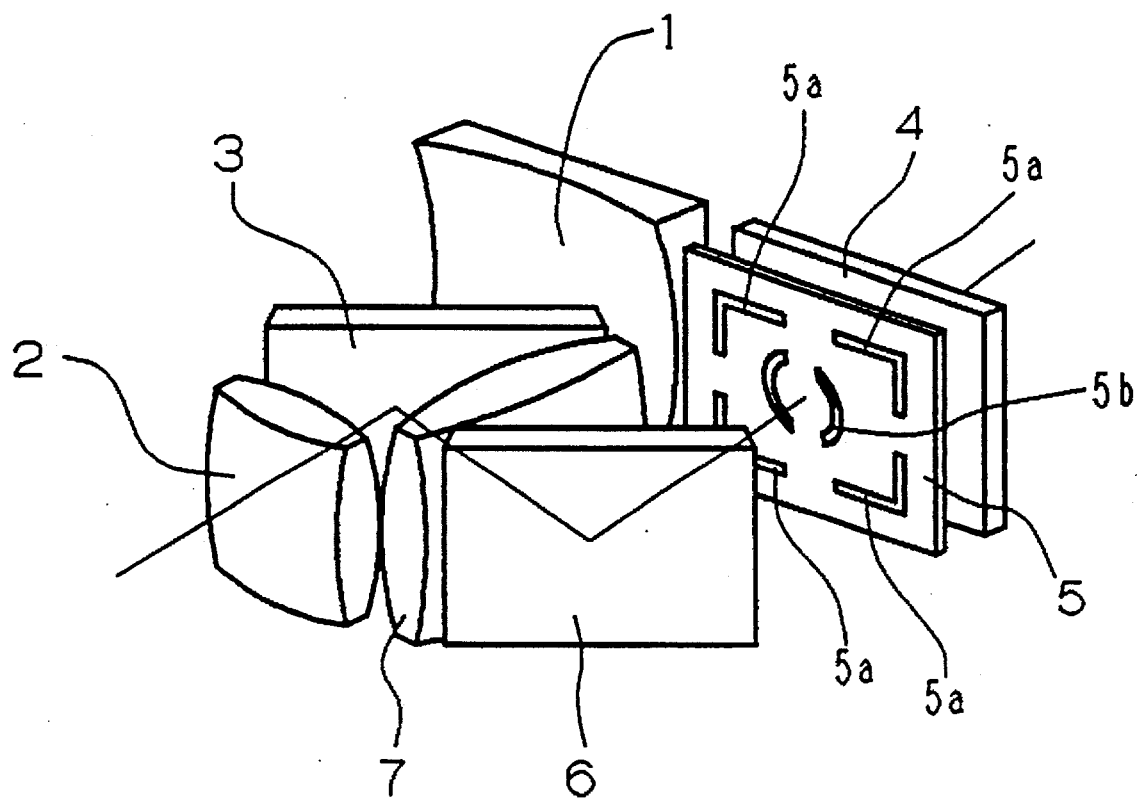
FIG. 5 is a schematic perspective view similar to FIG. 1, exemplarily illustrating a conventional bright frame view-finder of natural lighting type.

Referring to FIGS. 1 and 2, the view-finder optical system comprises an objective 11, an eyepiece 12 and a half-mirror 13. It should be understood that the half-mirror 13 may be replaced by a half-prism (not shown). Adjacent the objective 11 there is provided a light shaft window 14 in the form of diffusing plate, for example, made of frosted glass and behind this light shaft window 14 there is provided a secondary light generator plate 15 formed with a reflection-type hologram. Behind this secondary light generator plate 15 there is provided a field frame plate 16 having field display components such as a field frame 16a and a target mark 16b defined optionally defined as transparent or punched portions of the plate 16. Behind this field frame plate 16 there is provided a reflector 17 adapted to reflect the light which has been incident upon the light shaft window 14 in the form of diffusing plate and then transmitted through the secondary light generator plate 15 and the field frame plate 16 substantially at a right angle so as to be incident upon an intermediate lens 18. Light images of the field display components such as said field frame and target mark thus transmitted through said intermediate lens 18 are reflected on the half-mirror 13 so as to be laid upon an object image to be photographed.

A light source 19 is further provided adjacent the mutually opposed ends of the reflector 17 and the intermediate lens 18. Light source 19 may be a light emitting diode or a tungsten lamp serving as lighting means. This light source 19 is adapted to be turned on by operation of switching means or the like (not shown) provided on an external surface of the camera.

According to the embodiment illustrated by FIGS. 1 and 2, the outdoor daylight or ambient light incident on the light shaft window 14 in the form of diffusing plate is transmitted through the secondary light generator plate 15 and illuminates the field frame 16a and the target mark 16b so far as the outdoor daylight or ambient light of sufficiently high intensity is incident on the light shaft window 14. Images of these field display components such as said field frame 16a and said target mark 16b is then reflected on the reflector 17, transmitted through the intermediate lens 18 and reflected again on the half-mirror 13 so as to be laid upon the object image to be photographed.

For photographing in the dark, on the other hand, said switching means (not shown) may be turned on to activate the light source 19. The light emitted from the light source 19 is transmitted through the portions of the field frame plate 16 corresponding to the field display components such as the field frame 16a and the target mark 16b and illuminates the secondary light generator plate 15. The secondary light generator plate 15 has the hologram of reflection typed formed thereon and the portions corresponding to this regenerate a diffused light on the field frame side under illumination by the light coming from the light source 19 so as to form the light images of the field frame 16a and the target mark 16b, respectively, which are then reflected on the reflector 17, transmitted through the intermediate lens 18 and reflected again on the half-mirror 13 so as to be laid upon the object image to be photographed. In this manner, the field display components such as the field frame 16a and the target mark 16b are clearly imaged within the field of the view-finder even in the dark. It will be understood that the hologram may be formed on limited portions of the secondary light generator plate 15 on which the field frame 16a and the target mark 16b are to be projected since only these portions only are illuminated by the light source 19.

Now the second embodiment of the invention will be described in reference with FIG. 3. It should be understood that the construction of the view-finder optical system is similar to that in the first embodiment.

Behind the light shaft window 14 in the form of diffusing plate there is provided a secondary light generator plate 21 and behind this there is provided the field frame plate 16. The secondary light generator plate 21 is formed with diffusing surfaces 21a on a side opposed to the field frame plate 16 over zones opposed to the field display components such as the field frame 16a and the target mark 16b which are formed on said field frame plate 16. Areas over which said diffusing surfaces 21a are formed may be dimensioned respectively to cover the areas onto which the field frame 16a and the target mark 16b are projected. The remaining zone with respect to said diffusing surfaces 21a presents substantially smooth surface.

Adjacent a side surface of the secondary light generator plate 21 there is provided with a light source 22, for example, a light emitting diode or a tungsten lamp adapted to illuminate laterally the interior of the secondary light generator plate 21. The light source 22 is adapted to be turned on by operation of switching means (not shown) provided on the external surface of the camera.

Behind the field frame plate 16 there is provided the reflector 17 serving to reflect the light which has been incident on the light shaft window 14 in the form of diffusion plate and then transmitted through the field frame plate 16 substantially at a right angle so as to be incident on the intermediate lens 18. The light transmitted through the intermediate lens 18 is reflected at a right angle on the half-mirror 13 toward the eyepiece 12 so that the images of the field frame 16a and the target mark 16b may be observed through the eyepiece 12 as placed upon the object image to be photographed.

With this embodiment illustrated by FIG. 3, the outdoor daylight or ambient light incident on the light shaft window 14 is transmitted through the secondary light generator plate 21 and effectively illuminates the field frame 16a and the target mark 16b so far as the outdoor daylight or ambient light of sufficient intensity is available for intended photographing. In a consequence, the images of said field frame 16a and target mark 16b are reflected on the reflector 17, transmitted through the intermediate lens 18 and reflected again on the half-mirror 13 so that these images may be observed through the view-finder as laid upon the object image to be photographed.

For photographing in the dark, said switching means (not shown) may be operated to turn the light source 22 on. The light emitted from this light source 22 is incident on the lateral side of the secondary light generator plate 21, then propagates through the interior thereof and successively attains locations of the respective diffusing surfaces 21a whereupon the light is partially diffused outward. The light diffused outward from the respective diffusing surfaces 21a is transmitted through the field display components such as the field frame 16a and the target mark 16b and forms their images since said diffusing surfaces 21a are formed on the locations of the secondary light generator plate 21 opposed to the field frame 16a and the target mark 16b, respectively. The images of these field frame 16a and target mark 16b are reflected on the reflector 17, transmitted through the intermediate lens 18 and reflected again on the half-mirror 13 so as to be placed upon the object image to be photographed. In this manner, the field display components such as said field frame 16a and target mark 16b clearly appear within the field of the view-finder even when photographing is intended in the dark.

Also in the third embodiment illustrated by FIG. 4, the construction of the view-finder optical system is similar to that in the previously mentioned embodiments.

Behind the light shaft window 14 in the form of diffusing plate there is provided the reflector 17 so that the outdoor daylight or ambient light incident on said light shaft window 14 is reflected substantially at a right angle on this reflector 17. On a path of the reflected light there is provided a secondary light generator plate 31 formed thereon with hologram of transmission type. Behind this secondary light generator plate 31 there is provided a field frame plate 32 on which the field display components such as a field frame 32a and a target mark 32b are defined optionally as transparent or punched portions. Behind this field frame plate 32 there is provided an intermediate lens 33 so that the images of said field frame 32a and said target mark 32a formed by the outdoor daylight or ambient light transmitted through the field frame plate 32 are transmitted through said intermediate lens 33 and then reflected on the half-mirror 13 of the view-finder optical system so as to be laid upon the object image to be photographed.

A light source 34, for example, a light emitting diode or a tungsten lamp is provided between the light shaft window 14 in the form of diffusing plate and the reflector 17 adjacent the one ends mutually opposed of said light shaft window 14 and said reflector 17. This light source 34 is adapted to be turned on by operation of the switching means (not shown) provided on the external surface of the camera.

With the embodiment illustrated by FIG. 4, the outdoor daylight or ambient light incident on the light shaft window 14 in the form of diffusing plate is reflected substantially at a right angle on the reflector 17 and transmitted through the secondary light generator plate 31 so far as said outdoor daylight or ambient light is of intensity sufficiently high to assure the acceptable result of photographing. Said light illuminates the field frame 32a and the target mark 32b and thereby forms their images which are, in turn, transmitted through the intermediate lens 33 and reflected on the half-mirror 13 so as to be laid upon the object image to be photographed.

For photographing in the dark, said switching means (not shown) may be operated to turn the light source 34 on. The light emitted from this light source 34 illuminates the secondary light generator plate 31 formed with the hologram of transmission type and thereupon said secondary light generator plate 31 regenerates the diffused light directed toward the field frame plate under the effect of said hologram. The diffused light thus regenerated is transmitted through the field frame 32a and the target mark 32b on the field frame plate 32 and forms their bright images which are, in turn, transmitted through the intermediate lens 33 and reflected again on the half-mirror 13 so as to be laid upon the object image to be photographed. In this way, both the field frame 32a and the target mark 32b clearly appear within the field of the view-finder even in the dark.

It should be understood that the hologram may be formed on the secondary light generator plate 31 over limited zones thereof on which the field frame 32a and the target mark 32b are to be projected.

While the embodiments have been described above as their light sources 19, 22 and 34 being activated by turning on the switching means (not shown) associated therewith, it is also possible to activate each of these light sources in operative association with the main switch of the camera. In this case, an arrangement may be provided such that the light source 19, 22 or 34 is turned off when the outdoor daylight or ambient light has a sufficiently high intensity and turned on when the outdoor daylight or ambient light of such sufficiently high intensity is unavailable on the basis of photometric data provided from an automatic exposure circuit build in the camera. It is also possible to vary the intensity of the light source 19, 22 or 34 depending on the intensity of the outdoor daylight or ambient light. When the arrangement is employed in which the light source is operatively associated with the main switch of the camera, the light source 19, 22 or 34 is preferably adapted to be automatically turned off after a predetermined period for which no operation of the release button occurs in order to reduce consumption of a source battery.

EFFECT OF THE INVENTION

As will be apparent from the foregoing description, the bright frame view-finder of natural lighting type additionally provided with the light source for the secondary diffusing surfaces constructed in accordance with the invention allows the field display components such as the field frame and the target mark to appear within the field of the view-finder under the effect of light diffusion from the secondary light generator plate even for photographing in the dark in which the outdoor daylight or ambient light of sufficiently high intensity is unavailable. With an advantageous consequence, both the determination of composition and the ranging for autofocussing can be reliably achieved.

Furthermore, the invention provides a view-finder allows, in spite of its simplified construction, the field frame and the target mark to be easily observed, since the secondary light generator plate is formed with hologram of reflection or transmission type or comprises a transparent acryl plate partially formed with diffusing surfaces and the light source comprises a point source of light such as a light emitting diode.

What is claimed is:

1. A bright frame view-finder of natural lighting type, comprising:

a view-finder optical system;

a field frame plate formed with a field frame, said field frame plate having a light incident surface being lighted by outdoor daylight or ambient light so that light images of said field frame may be introduced into said view-finder optical system so as to be laid upon an object image to be photographed;

diffusing means provided adjacent said light incident surface of said field frame plate, said diffusing means being transmissive; and lighting means provided so as to emit lighting rays onto said diffusing means;

wherein said diffusing means is lighted by said lighting means so as to introduce the light image of the field frame into said view-finder optical system when the outdoor daylight or ambient light is not sufficiently intense; and wherein said diffusing means is formed with a reflection-type hologram and said light means is disposed so as to illuminate said reflection-type hologram with light passing through said field frame plate.

2. The bright frame view-finder of natural lighting type according to claim 1, wherein said lighting means comprises a light emitting diode.

3. The bright frame view-finder of natural lighting type according to claim 1, wherein said lighting means comprises a tungsten lamp.

4. The bright frame view-finder as defined in claim 1 further including a diffusing plate provided adjacent said diffusing means for diffusing natural light from the exterior of the camera prior to its introduction to said field frame plate.

5. A bright frame view-finder of natural lighting type, comprising:

a view-finder optical system;

a field frame plate formed with a field frame, said field frame plate having a light incident surface being lighted by outdoor daylight or ambient light so that light images of said field frame may be introduced into said view-finder optical system so as to be laid upon an object image to be photographed;

diffusing means provided adjacent said light incident surface of said field frame plate, said diffusing means being transmissive; and lighting means provided so as to emit lighting rays onto said diffusing means;

wherein said diffusing means is lighted by said lighting means so as to introduce the light image of the field frame into said view-finder optical system when the outdoor daylight or ambient light is not sufficiently intense; and wherein said diffusing means is formed with a transmission-type hologram and said lighting means is disposed such that light transmitted through said transmission type hologram illuminates said light incident surface of said field frame plate.

6. The bright frame view-finder of natural lighting type according to claim 5, wherein said lighting means comprises a light emitting diode.

7. The bright frame view-finder of natural lighting type according to claim 5, wherein said lighting means comprises a tungsten lamp.

8. The bright frame view-finder as defined in claim 5 further including a diffusing plate provided adjacent said diffusing means for diffusing natural light from the exterior of the camera prior to its introduction to said field frame plate.

* * * * *